United States Patent Office 2,835,652
Patented May 20, 1958

2,835,652
ORGANIC PHOSPHORUS CONTAINING ISOCYANATES AND POLYMERS

Alfred C. Haven, Jr., Hancocks Bridge, N. J., assignor to E. I. du Pont de Nemours and Company, Wilmington, Del., a corporation of Delaware No Drawing. Application April 16, 1954
Serial No. 423,838

13 Claims. (Cl. 260—47)

This invention relates to a new class of phosphorus-containing organic isocyanates, a process for their preparation, and new polymeric addition products formed from these compounds. More particularly it relates to organic compounds in which isocyanate radicals are attached directly to phosphorus.

As a result of the ease with which the isocyanate group reacts with compounds containing active hydrogen atoms such as are present in hydroxyl, sulfhydryl, carboxyl, amino and imino groups, organic isocyanates are useful in a wide variety of chemical reactions and industrial applications. The reactions of isocyanates with such active hydrogen containing compounds have been utilized in the manufacture of synthetic fibers, elastomers, adhesives, and rigid and elastic foams. Organic compounds containing phosphorus also have valuable properties. Phosphorus compounds are useful as fire retardants, corrosion inhibitors, extreme pressure lubricants, and as combustion modifiers.

In pending applications Serial Nos. 252,811 and 252,812 of Kvalnes et al., filed October 23, 1951, now U. S. Patents 2,691,566 and 2,691,567, respectively, there are described isocyanate dimers containing phosphorus atoms. These products do not contain free isocyanate groups and in every case the phosphorus is separated from the isocyanate dimer by intervening atoms.

It is an object of this invention to provide a new class of organic compounds in which isocyanate radicals are attached directly to phosphorus. A further object is to provide a process by which such compounds may be obtained. A further object is the provision of a useful class of polymeric addition products containing phosphorus. Further objects will appear from the detailed description of this invention which follows.

According to the present invention, compounds having the formula

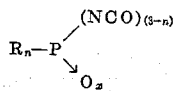

in which R is an organic radical from the class consisting of hydrocarbo, halohydrocarbo, nitrohydrocarbo and hydrocarboxy radicals, $n$ is an integer from 1 to 2, and $x$ is an integer from 0 to 1, are obtained by reacting together a compound having the formula

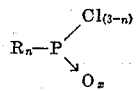

in which R, $n$ and $x$ have the significance above described with a metal cyanate. The metal chloride is formed as a by-product.

In a typical embodiment of this invention, ethylphosphonyl diisocyanate, having the formula

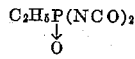

is formed by reacting together ethylphosphonyl dichloride and silver cyanate. The reaction is preferably carried out in an organic solvent which is free from active hydrogen atoms.

The compounds of this invention are usually colorless liquids boiling from 10 to 20° C. higher than the corresponding chlorides from which they are prepared. They react readily with water. When reacted with alcohols or phenols they form urethanes which are ordinarily crystalline products.

Useful polymeric addition products are obtained by reacting together the phosphorus-containing organic diisocyanates of this invention with organic compounds containing a plurality of atoms to which are attached active hydrogen atoms. The term "active hydrogen atoms" refers to hydrogens which, because of their position in the molecule, display activity according to the Zerewitinoff test as described in J. Am. Chem. Soc. 49, 3181 (1927). Thus a useful polymeric adduct is formed by reacting together ethylphosphonyl diisocyanate and hydroquinone. As compared with similar products obtained from diisocyanates which do not contain the phosphorus atom, these products are characterized by resistance to burning.

The organic radical in the compounds of this invention may be a hydrocarbo radical, i. e., contain only carbon and hydrogen atoms, or it may be a halohydrocarbo, a nitrohydrocarbo or a hydrocarboxy radical. Useful compounds in which the organic radical is a hydrocarbo radical include those in which the radical is alkyl, such as methyl, ethyl, isopropyl, amyl, decyl, or octadecyl; aryl, such as phenyl, tolyl, xylyl, diphenyl or naphthyl; aralkyl, such as benzyl or phenylethyl; and cycloalkyl, such as cyclopentyl, methylcyclopentyl, ethylcyclohexyl, or dimethylcyclohexyl. Examples of useful compounds in which the organic radical is a halohydrocarbo radical include those in which the radical is chlormethyl, chlorethyl, bromethyl, fluorethyl, chlorphenyl, chlorbenzyl, chlormethylcyclohexyl and chlorcyclohexyl. The organic radical may also be a nitrohydrocarbo radical such as nitroethyl, nitrophenyl or nitrocyclohexyl, or a hydrocarboxy radical such as methoxy, ethoxy, isopropoxy, phenoxy, benzyloxy, phenylethoxy or cyclohexyloxy.

The compounds of this invention contain either one or two isocyanate groups and are either phosphonyl or phosphine derivatives depending on whether or not an oxygen atom is attached to the phosphorus. Thus

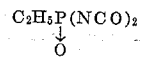

is ethylphosphonyl diisocyanate while $C_2H_5P(NCO)_2$ is ethyldiisocyanatophosphine.

The organic phosphorus isocyanates of this invention are readily prepared by mixing the corresponding organic phosphorus chloride with a metal cyanate at room temperature or at only moderately elevated temperature. It is convenient to carry out the reaction in the presence of an organic solvent, although this is not necessary. The solvent should not contain active hydrogen atoms which will react with isocyanates. Hydrocarbons, ethers, nitriles, nitrohydrocarbons and the like make suitable solvents. Materials such as alcohols are unsuitable since the isocyanates will react with the hydroxyl groups to form urethanes. When polar solvents such as nitrobenzene are used, the reaction takes place rapidly and cooling is normally required to control the reaction. The reaction rate may also be controlled by adding one of the reactants gradually or in small portions. With non-polar solvents, the reaction is more sluggish and it is sometimes necessary to heat the mixture to drive the reaction to completion within a reasonable time.

Any metal cyanate may be employed in the preparation of these compounds, but silver cyanate and potassium cyanate are preferred because of their ready availability. Lead cyanate is also satisfactory. When the reaction is carried out in the presence of a solvent, the metal chloride usually separates as a solid and is readily filtered off. The solvent may then be evaporated to recover the organic phosphorus isocyanate.

The preparation of the compounds of this invention and their use in the formation of polymeric products are shown in the following examples in which parts are by weight.

*Example 1*

Into a vessel equipped with an agitator and a reflux condenser are placed 200 parts of acetonitrile (previously dried and freed from acetamide by distilling from phosphorus pentoxide) and 72.75 parts of powdered silver cyanate. The mass is heated to about 75° C. while agitating and 35 parts of ethylphosphonyl dichloride are added slowly and uniformly over a period of about 15 minutes. The reaction is quite fast and vigorous and the solvent refluxes, the temperature being about 80° C. After all the ethylphosphonyl dichloride is added, stirring under reflux is continued for one hour. The mass is cooled somewhat and the suspended silver chloride is filtered off. The acetonitrile is then distilled off under vacuum. The residue is distilled at 0.65–1.0 mm. pressure and a single fraction boiling at 61–65° C. is obtained. The distillate is a clear, water-white liquid which reacts vigorouly with water, evolving carbon dioxide according to the typical reaction of isocyanates. The non-volatile residue does not distill at 300° C. at 2 mm. pressure. It is a viscous liquid which also evolves carbon dioxide when mixed with water.

Analysis of the distillate is as follows:

|   | Calc. for $C_2H_5P(NCO)_2 \downarrow O$ | Found |
|---|---|---|
|   | Percent | Percent |
| C | 30.0 | 29.8 |
| H | 3.15 | 3.2 |
| N | 17.5 | 16.8 |
| P | 19.3 | 19.3 |

A portion of the distillate is added to an excess of aniline. There is a vigorous reaction, without gas evolution, and a white solid separates. The white solid is filtered off, washed with 6 N hydrochloric acid, water, ethyl alcohol, and then ether and dried. The bis-phenylurea derivative thus formed has a melting point of 204–205° C. and shows the following analysis:

|   | Calc. for $C_2H_5-P(NHCONHC_6H_5)_2 \downarrow O$ | Found |
|---|---|---|
|   | Percent | Percent |
| C | 55.5 | 55.4 |
| H | 5.53 | 5.32 |
| N | 16.3 | 16.75 |

Another portion of the distillate is added to an excess of anhydrous methanol. A vigorous exothermic reaction takes place without the evolution of gas, but no solid forms. The methanol is removed by evaporation and an oil is recovered which crystallizes from ether as a white solid melting at 138–143° C. On recrystallization from a mixture of methanol and anhydrous ether crystalline, white rosettes are obtained, melting at 142–144° C. This bis-methylurethane derivative shows the following analysis:

|   | Calc. for $C_6H_{13}N_2O_5P$ | Found |
|---|---|---|
|   | Percent | Percent |
| C | 32.1 | 32.2 |
| H | 5.84 | 5.93 |
| N | 12.5 | 12.3 |

If instead of ethylphosphonyl dichloride there is used an equivalent amount of ethyl dichlorophosphine, the resultant product is ethyldiisocyanatophosphine, $$C_2H_5P(NCO)_2$$

which has similar reactivity.

*Example 2*

Into a vessel fitted with a reflux condenser are placed 480 parts of dry benzene and 150 parts of powdered silver cyanate. There are added 73.5 parts of ethylphosphonyl dichloride. The mass is heated at reflux (about 80° C.) for nine hours. The suspension is filtered, the benzene distilled from the filtrate under reduced pressure and the ethylphosphonyl diisocyanate is distilled off at 69° C. under a pressure of 1.5 mm.

*Example 3*

Into a vessel equipped with a reflux condenser are placed 200 parts of acetonitrile (distilled from phosphorus pentoxide), 40.5 parts of powdered potassium cyanate, and 37 parts of ethylphosphonyl dichloride. The mixture is heated under reflux for 20 hours. The mass is cooled, the solid is filtered off, and the solvent is distilled off. On distillation at 1 mm. pressure, unreacted ethylphosphonyl dichloride distills off first about 38–40° C. and then ethylphosphonyl diisocyanate distills off at 65° C.

*Example 4*

Into a vessel equipped for agitation are placed 160 parts of acetonitrile (distilled over phosphorus pentoxide) and 60 parts of silver cyanate. 32 parts of isopropylphosphonyl dichloride are added gradually, while agitating, during about 20 minutes. The temperature is held between about 25° C. and 50° C. during this time by applying cooling water to the vessel. Stirring is continued for forty minutes after the addition of the isopropylphosphonyl dichloride is completed. The mass is filtered, the solvent is distilled off and the isopropylphosphonyl diisocyanate is distilled off at 61–67° C. under a pressure of 1 to 1.75 mm. pressure.

The bis-phenylurea derivative is prepared by the procedure of Example 1 and melts at 192–193° C. It shows the following analysis:

|   | Calc. for $C_{17}H_{21}N_4O_3P$ | Found |
|---|---|---|
|   | Percent | Percent |
| C | 56.7 | 57.25 |
| H | 5.88 | 6.0 |
| N | 15.5 | 14.45 |

The bis-methylurethane is also prepared. It melts at 163–166° C. and analyzes as follows:

|   | Calc. for $C_7H_{15}N_2O_4P$ | Found |
|---|---|---|
|   | Percent | Percent |
| C | 35.3 | 35.3 |
| H | 6.35 | 6.35 |
| N | 11.75 | 11.4 |

Example 5

A suspension of 60 parts of silver cyanate in 200 parts of benzene is dried by refluxing into a continuous water separating receiver. Then 30 parts of chloromethylphosphonyl dichloride is gradually added over about 20 minutes while agitating and maintaining the benezene solution at the reflux. Heating and stirring are continued for an additional hour. The reaction mass is cooled, filtered, and the benzene is distilled off. The residue is distilled, some unreacted chloromethylphosphonyl dichloride distilling off first and then the chloromethylphosphonyl diisocyanate is collected at 76–82° C. under 0.6 mm. pressure. This water-white liquid rapidly evolves carbon dioxide when mixed with water and forms a bis-phenylurea derivative (M. P. 199–200° C.) and a bis-methylurethane derivative (M. P. 181–183° C.) by the previously described procedure.

ANALYSES

|   | Bis-phenylurea | | Bis-methylurethane | |
|---|---|---|---|---|
|   | Calc. | Found | Calc. | Found |
|   | Percent | Percent | Percent | Percent |
| C | 49.1 | 48.75 | 24.5 | 24.4 |
| H | 4.36 | 4.39 | 4.12 | 4.11 |
| N | 15.3 | 15.05 | 11.45 | 11.25 |

Example 6

A suspension of 60 parts of silver cyanate, 35.4 parts of phenyldichlorophosphine and 80 parts of benzene is refluxed for 90 minutes. The suspended solid is filtered off and the benzene is evaporated. The residue is distilled at a pressure of 3 mm. and the phenyldiisocyanatophosphine is collected as a fraction boiling at 118–122° C. It is a colorless mobile liquid which reacts vigorously with water with evolution of carbon dioxide. The bis-phenylurea melts at 175–178° C. and the bis-methylurethane melts at 161–163° C. Analyses of the derivatives are as follows:

|   | Bis-phenylurea $C_{20}H_{19}N_4O_2P$ | | Bis-methylurethane $C_{10}H_{13}N_2O_4P$ | |
|---|---|---|---|---|
|   | Calc. | Found | Calc. | Found |
| C | 63.4 | 62.8 | 46.9 |  |
| H | 5.06 | 5.30 | 5.11 | 4.9 |
| N | 14.8 | 14.0 | 10.9 | 10.5 |

Example 7

To a suspension of 70 parts of silver cyanate in 80 parts of acetonitrile (distilled over phosphorus pentoxide) is added a solution of 47.1 parts of benzylphosphonyl dichloride in 40 parts of dry benzene. The reaction mass is stirred at 40–50° C. for about 30 minutes and then a further 2 hours at about 25° C. The insoluble silver salt is filtered off and the solvents removed under vacuum. The benzylphosphonyl diisocyanate is recovered by distillation at 1–2 mm. at 145° C. It is necessary to keep the pot temperature below about 200° C. since the material polymerizes very rapidly at temperatures above 200° C.

The colorless liquid distillate reacts rapidly with water, evolving carbon dioxide. The bis-phenylurea derivative is a white, crystalline solid melting at 188–193° C. while the bis-methylurethane melts at 179–181° C.

ANALYSES

|   | Bis-phenylurea $C_{21}H_{21}N_4O_2P$ | | Bis-methylurethane $C_{11}H_{15}N_2O_4P$ | |
|---|---|---|---|---|
|   | Calc. | Found | Calc. | Found |
| C | 61.8 | 62.3 | 46.2 | 45.5 |
| H | 5.18 | 5.18 | 5.28 | 5.2 |
| N | 13.7 | 13.85 | 9.79 | 10.1 |

Example 8

To an agitated suspension of silver cyanate in 160 parts of acetonitrile (distilled over phosphorus pentoxide) are added gradually 35 parts of phenylphosphonyl dichloride over a period of 20 minutes while the temperature is maintained at 10–20° C. by cooling. After the addition is complete, the reaction mixture is heated to 45–50° C. for 30 minutes. The insoluble solid is filtered off and the solvent is removed by heating under vacuum. After removal of the solvent, an oily liquid remains which evolves carbon dioxide when treated with water and gives a white solid bis-phenylurea derivative melting at 192–193° C. The crude phenylphosphonyl diisocyanate polymerizes to a glassy solid when heated to 200° C. This solid polymer also has —NCO groups since it evolves carbon dioxide when treated with water.

Example 9

To an agitated suspension of 60 parts of silver cyanate in 80 parts of acetonitrile (distilled over phosphorus pentoxide) is added gradually over a 20 minute period 68.5 parts of hexadecylphosphonyl dichloride [prepared according to Kinnear and Perren, J. Chem. Soc. 3437 (1952)]. The temperature is maintained at 20–30° C. by cooling during the addition. The mixture is then stirred a further 2 hours at 20–30° C. The insoluble silver salt is filtered off and the solvent evaporated under vacuum. The crude hexadecylphosphonyl diisocyanate is a viscous oil.

Example 10

To an agitated suspension of 60 parts of silver cyanate in 160 parts of acetonitrile (distilled over phosphorus pentoxide) are added 38 parts of phenyldichlorophosphate over a period of about 20 minutes. The temperature is mainated at 20–30° C. by cooling. After the addition is complete stirring is continued for 4 hours at 20–30° C. The solid silver chloride was filtered off and the filtrate was evaporated under vacuum to remove the solvent. The crude phenyldiisocyanatophosphate,

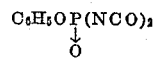

(phenoxyphosphonyl diisocyanate) is a viscous, oily liquid which reacts vigorously with water, evolving carbon dioxide and polymerizing to a glassy solid at 200° C.

Example 11

An agitated suspension of 60 parts of silver cyanate, 69 parts of diethylchlorophosphate, and 160 parts of acetonitrile (distilled over phosphorus pentoxide) is heated to reflux for 3 hours. The reaction mass is cooled and filtered. The solvent is evaporated off. The residue is distilled at 0.3–0.5 mm. pressure and the diethylisocyanatophosphate or diethoxyphosphonyl isocyanate,

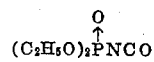

is obtained as a fraction boiling at 60–65° C. It is a colorless, limpid liquid, which reacts vigorously with water to evolve carbon dioxide and reacts with aniline

Example 12

Four (4) parts of ethylphosphonyl diisocyanate are mixed with 2.68 parts of p-phenylene diamine. There is an immediate exothermic reaction. After about 30 minutes the mass is heated to 70–90° C. for 90 minutes. The mass turns to white, crumbly powder. The molar ratio of the reactants is 1:1 so the resulting condensation polymer should be of further high molecular weight. This is borne out by the fact that it does not melt at 300° C. The calculated nitrogen analysis for the empirical formula $(C_{10}H_{13}N_4O_3P)_x$ is 20.9% and analysis shows 20.65%. The polymer is insoluble in water, 6 N hydrochloric acid, ethyl alcohol, and pyridine.

Four (4) parts of ethylphosphonyl diisocyanate are mixed with 2.96 parts of 1,6-hexanediol (molar ratio 1:1). An exothermic reaction begins and the solid diol melts. The reaction mass, which is now a limpid liquid, is heated slowly to 250° C. over 2½ hours. The mass gradually becomes more viscous until a taffy-like white mass results. This polyurethane condensation product is still somewhat tacky when cooled to room temperature. It is insoluble in water but partially soluble in hot ethanol.

Example 13

Four (4) parts of ethylphosphonyl diisocyanate and 2.75 parts of hydroquinone (molar ratio 1:1) are mixed and heated to approximately 200° C. As the temperature increases the mass becomes increasingly viscous and a small amount of gas bubbles off. When the temperature reaches 200° C., the pressure is reduced by a vacuum pump to about 1 mm. and the mass is maintained under this pressure at about 200° C. for about 15 minutes. It is then cooled to room temperature. The resulting polymer is a hard, pale yellow, translucent, glassy mass. It has a melting range of 233–280° C. with some decomposition. It is insoluble in water and ethanol. Analysis for phosphorus shows 11.6% as compared to a theory of 11.5%.

A portion is melted and touched with a glass rod which is rapidly removed, thus drawing out a fine fiber. This fiber is flexible and will burn when held in a flame but quickly becomes extinguished when the flame is removed. Melt-spun fibers which will not support combustion may thus be obtained.

One part of the polymer is dissolved in 10 parts of dimethyl formamide to form a clear solution. A strip of paper is immersed in the solution, removed, allowed to drain and then dried. The paper is slightly less flexible than before the treatment, but otherwise appears unchanged. When the treated paper is ignited with a flame, however, it quickly becomes extinguished when the flame is removed. There is no after-glow in the charred residue. A wood splint is similarly dipped, drained and dried. It also will not support combustion.

The isocyanates of this invention undergo the same varied types of reactions as other organic isocyanates. They will react with any material containing active hydrogen atoms, such as are present in water, alcohols, amines, carboxylic acids, mercaptans, and imines. High molecular weight materials such as cellulose, starch, alkyd resins and the like may be modified by treatment with the isocyanates of this invention. When a diisocyanate is reacted with a compound containing two or more atoms to which active hydrogen is attached, useful polymeric adducts may be formed. The active hydrogen containing compounds which may be reacted with the diisocyanates of this invention to form useful polymeric adducts include compounds with two or more hydroxyl, sulfhydryl, imino, amino, carboxyl, carbamyl, sulfo, sulfamyl and thiocarbamyl radicals. Diols such as ethylene glycol, octamethylene glycol, resorcinol; diamines such as ethylenediamine, 2,4-tolylenediamine, cyclohexylene-1,4-diamine, hexamethylene diamine; and amine-alcohols such as ethanolamine, etc. are particularly useful members of this class of compounds for reaction with the diisocyanates of this invention. If approximately stoichiometric proportions of reactants are used, polymeric products of high molecular weight are obtained, which may be employed in the form of fibers, films, cellular or solid articles. Depending upon the reactants used and the proportions, the products may be elastic or plastic. In every case the presence of the phosphorus atom as an integral part of the molecule imparts flame resistance to the product.

A particularly valuable use of these products is as curing agents for thermoplastic resins containing active hydrogen atoms. Treatment with the phosphorus isocyanates reduces the solubility of the resins in solvents and increases the temperature range at which they may be employed. The diisocyanates of this invention are also useful as curing agents for elastomeric polymers and in the preparation of flame resistant cellular products.

What is claimed is:

1. A compound having the formula

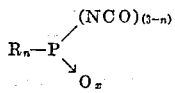

in which R is an organic radical from the class consisting of hydrocarbo, halohydrocarbo, nitrohydrocarbo and hydrocarboxy radicals, n is an integer from 1 to 2, and x is an integer from 0 to 1.

2. A hydrocarbophosphonyl diisocyanate.
3. A hydrocarbodiisocyanatophosphine.
4. An alkylphosphonyl diisocyanate.
5. Ethylphosphonyl diisocyanate.
6. Ethyldiisocyanatophosphine.
7. Phenylphosphonyl diisocyanate.
8. A process for preparing a compound having the formula

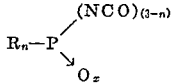

in which R is an organic radical from the class consisting of hydrocarbo, halohydrocarbo, nitrohydrocarbo and hydrocarboxy radicals, n is an integer from 1 to 2, and x is an integer from 0 to 1, which comprises reacting together a compound having the formula

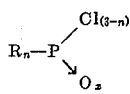

in which R, n and x have the significance above stated with a metal cyanate in an inert organic solvent at a temperature of from about 10° C. to 80° C.

9. A process according to claim 8 in which the metal cyanate is silver cyanate.

10. A process for the preparation of ethylphosphonyl diisocyanate which comprises reacting together ethylphosphonyl dichloride and silver cyanate in an inert organic solvent at a temperature of about 80° C.

11. A polymeric addition product of ethylphosphonyl diisocyanate and hydroquinone obtained by reacting said diisocyanate with hydroquinone at a temperature of about 200° C.

12. A polymeric addition product of ethylphosphonyl diisocyanate and p-phenylene diamine obtained by reacting said diisocyanate with said diamine at a temperature of about 70° to 90° C.

13. A polymeric addition product obtained by reacting, at a temperature of from about 70 to 250° C., a hydrocarbophosphonyl diisocyanate with an organic compound containing a plurality of active hydrogen containing groups which are reactable with isocyanate groups.

References Cited in the file of this patent

UNITED STATES PATENTS 2,449,613     Miller et al. _____ Sept. 21, 1948

OTHER REFERENCES

Williams, Cyanogen Compounds, Arnold and Company, London, 2nd edition, 1948, pages 76, 77 and 300.

Michaelis: Liebig's Annalen der Chemie, volume 293, pages 213 to 214 (1896).

Dixon et al.: "The Journal of the Chemical Society," vol. 93, pages 2148–2163 (1908).